(12) United States Patent
Mukherjee et al.

(10) Patent No.: US 8,065,334 B2
(45) Date of Patent: Nov. 22, 2011

(54) WARRANTY INSIGHT SOLUTION FRAMEWORK SYSTEM AND METHOD

(75) Inventors: Partha Mukherjee, Bangalore (IN); Anand Vasant Batagurki, Bangalore (IN); Sanjeev K. Itagi, Bangalore (IN)

(73) Assignee: Wipro Limited, Bangalore, Karnataka (IN)

( * ) Notice: Subject to any disclaimer, the term of this patent is extended or adjusted under 35 U.S.C. 154(b) by 503 days.

(21) Appl. No.: 11/927,712

(22) Filed: Oct. 30, 2007

(65) Prior Publication Data

US 2009/0112907 A1    Apr. 30, 2009

(51) Int. Cl.
  *G06F 7/00*    (2006.01)
(52) U.S. Cl. .................. 707/792; 707/811
(58) Field of Classification Search ........... 707/2, 792, 707/811; 702/22
  See application file for complete search history.

(56) References Cited

U.S. PATENT DOCUMENTS

| | | | |
|---|---|---|---|
| 2005/0015217 A1* | 1/2005 | Weidl et al. | 702/185 |
| 2006/0161544 A1* | 7/2006 | Lee et al. | 707/6 |
| 2007/0005266 A1* | 1/2007 | Blevins et al. | 702/22 |
| 2008/0059120 A1* | 3/2008 | Xiao et al. | 702/184 |
| 2009/0018996 A1* | 1/2009 | Hunt et al. | 707/2 |
| 2009/0307145 A1* | 12/2009 | Mesaros | 705/80 |
| 2009/0313365 A1* | 12/2009 | Whitehead | 709/223 |

* cited by examiner

*Primary Examiner* — Shahid Alam
*Assistant Examiner* — Donald Lawson
(74) *Attorney, Agent, or Firm* — Prakash Nama; Global IP Services, PLLC

(57) ABSTRACT

A system and method of warranty insight solution are disclosed. In one embodiment, a method includes populating a data mart with data from a number of sources, text analyzing and mining the unstructured data of the data mart according to a uniform structure, performing root cause analysis assistance on staged data mart data, generating root cause analysis output from the root cause analysis, merging the root cause analysis output with the data of the data mart, and generating final output based on a portion of the merged data of the data mart. The data may include data selected from a group including warranty claim data, traceability data, supplier data, manufacturer data, retailer data, customer data, component data, service data, failure data, field data, vehicle failure fault codes trough telematics, and collection center data.

25 Claims, 6 Drawing Sheets

US 8,065,334 B2

WARRANTY INSIGHT SOLUTION FRAMEWORK SYSTEM AND METHOD

CLAIMS OF PRIORITY

This patent application claims priority from India Provisional patent application number 1056/CHE/2007 titled, "WARRANTY INSIGHT SOLUTION FRAMEWORK", filed on May 21, 2007 in the Indian Patent Office, the entire content of which is incorporated herein by reference.

FIELD OF THE INVENTION

The present invention relates generally to hardware and software and more particularly relates to techniques of a warranty insight solution framework system and method.

BACKGROUND

Various organizations may offer warranties for products and/or services. One example is automotive warranties offered by automobile manufacturers for component failures/nonconformance. Claims arising under the warranties as a result of warranty failures may result in large settlement awards or judgments for claimants. Expenses associated with the settlement awards or the judgments may accrue to an excess of one billion dollars. In addition, warranty failures may negatively impact financial performance, brand value, and customers' perceptions of the organization.

Further, the organization may be unable to collect, manage, or interpret data related to warranty failure. Without such capabilities, the organization may be unable to identify failure points, may be unable to exact cost recoveries from suppliers of the products, and may be unable to accurately forecast future warranty expenses.

Current attempts to address the foregoing issues may not provide a comprehensive failure analysis of design improvement activities. Further, the attempts may not address issues of entities related to the organization, such as a supplier or a retailer associated with the organization. The issues may include, for example, excessive timelines for replacement of failed components and replacement of a working component rather than the failed component.

BRIEF DESCRIPTION OF THE DRAWINGS

Example embodiments are illustrated by way of example and not limitation in the figures of the accompanying drawings, in which like references indicate similar elements and in which.

Figure 1:
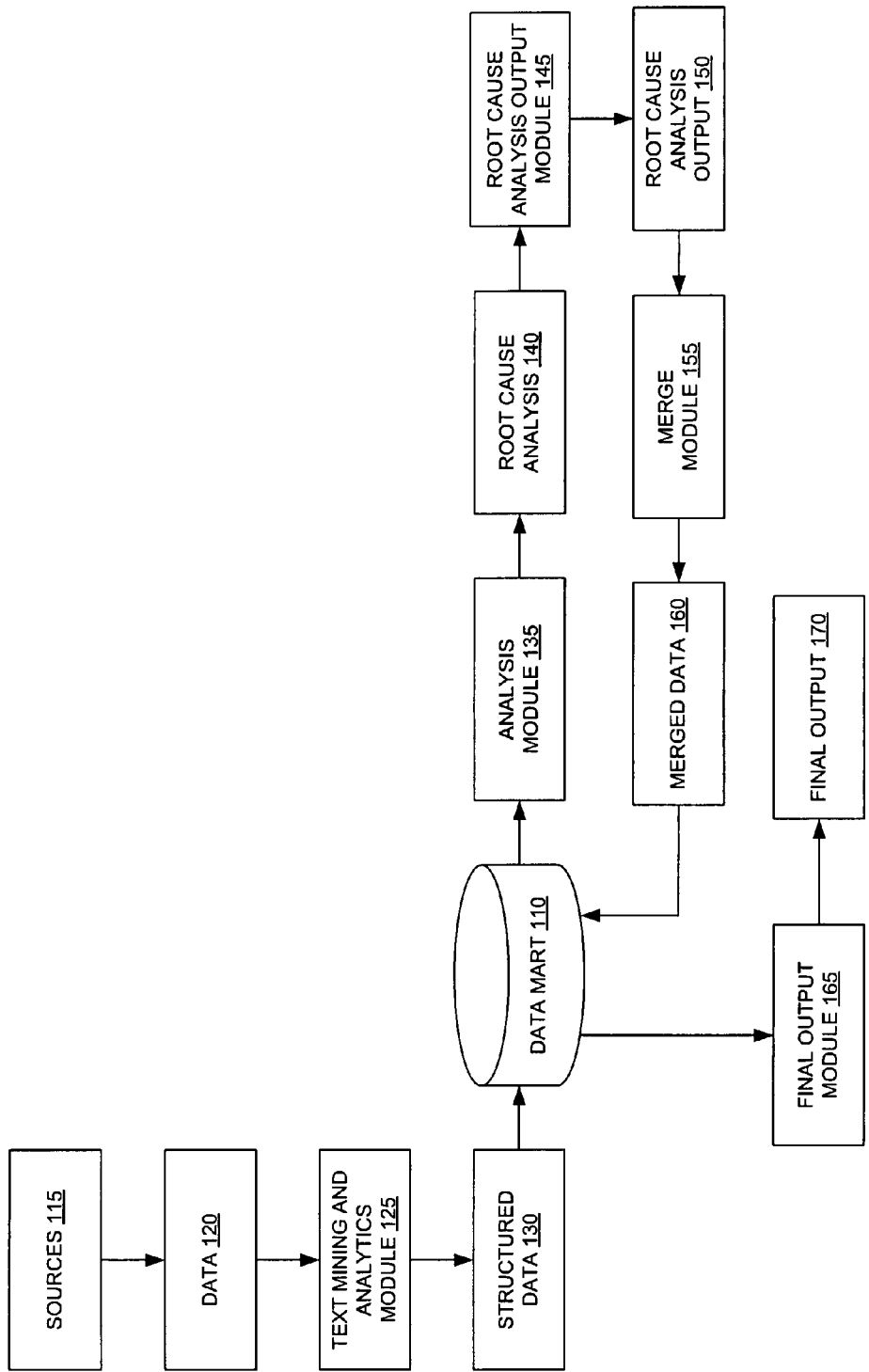
FIG. 1 is a block diagram illustrating a warranty insight solution framework system, according to one embodiment.

Other features of the present embodiments will be apparent from the accompanying drawings and from the detailed description that follows.

DETAILED DESCRIPTION

A system and method of warranty insight solution framework are disclosed. In the following description, for purposes of explanation, numerous specific details are set forth in order to provide a thorough understanding of the various embodiments. It will be evident, however, to one skilled in the art that the various embodiments may be practiced without these specific details.

The terms "data" and "unstructured data" are used interchangeably throughout the document.

In one embodiment, a method includes populating a data mart (e.g., the data mart 110 of FIG. 1) with data (e.g., the data 120 of FIG. 1) from a number of sources (e.g., the sources 115 of FIG. 1), text analyzing and mining the unstructured data 120 of the data mart 110 (e.g., using the text mining and analytics module 125 of FIG. 1) according to a uniform structure, performing root cause analysis 140 (e.g., using the analysis module 135 of FIG. 1) assistance on staged data mart data, generating root cause analysis output 150 (e.g., using the root cause analysis output module 145 of FIG. 1) from the root cause analysis 140, merging the root cause analysis output 150 (e.g., using the merge module 155 of FIG. 1) with the data 120 of the data mart 110, and generating final output (e.g., using the final output module 165 of FIG. 1) based on a portion of the merged data 160 of the data mart 110.

In another embodiment, a system includes a data mart (e.g., the data mart 110 of FIG. 1) populated with data (e.g., the data 120 of FIG. 1) from a number of sources (e.g., the sources 115 of FIG. 1), a text mining and analytics module (e.g., the text mining and analytics module 125 of FIG. 1) to structure the unstructured data 120 of the data mart 110 according to a uniform structure, an analysis module (e.g., the analysis module 135 of FIG. 1) to assist root cause analysis 140 on staged data mart data, a root cause analysis output module (e.g., the root cause analysis output module 145 of FIG. 1) to generate root cause analysis output 150 from the root cause analysis 140, a merge module (e.g., the merge module 155 of FIG. 1) to merge the root cause analysis output 150 with the data 120 of the data mart 110, and a final output module (e.g., the final output module 165 of FIG. 1) to generate final output 170 based on a portion of the merged data 160 of the data mart 110.

In yet another aspect, an article includes a storage medium having instructions, that when executed by a computing platform, result in execution of a method of generating parallelizable application units, including populating a data mart (e.g., the data mart 110 of FIG. 1) with data (e.g., the data 120 of FIG. 1) from a number of sources (e.g., the sources 115 of FIG. 1), text analyzing and mining the unstructured data 120 of the data mart 110 (e.g., using the text mining and analytics module 125 of FIG. 1) according to a uniform structure, performing root cause analysis 140 (e.g., using the analysis module 135 of FIG. 1) assistance on staged data mart data, generating root cause analysis output 150 (e.g., using the root cause analysis output module 145 of FIG. 1) from the root cause analysis 140, merging the root cause analysis output 150 (e.g., using the merge module 155 of FIG. 1) with the data 120 of the data mart 110, and generating final output 170 (e.g., using the final output module 165 of FIG. 1) based on a portion of the merged data 160 of the data mart 110.

FIG. 1 is a block diagram illustrating a warranty insight solution framework system, according to one embodiment.

Particularly, FIG. 1 illustrates the data mart 110, sources 115, the data 120, a text mining and analytics module 125, an analysis module 135, a root cause analysis output module 145, a merge module 155 and the final output module 165, according to one embodiment.

The data mart 110 may be a database containing the data 120. In one embodiment, the data mart 110 is populated with the data 120 from various sources 115. The sources 115 of the data 120 may include sources selected from the group including suppliers 115A, manufacturers 115B, retailers 115C, customers 115D, field sources 115E, vehicle telematics 115F, and collection centers 115G. In some embodiments, the data 120 include data selected from the group including warranty claim data 120A, traceability data 120B, supplier data 120C, manufacturer data 120D, retailer data 120E, customer data 120F, component data 120G, service data 120H, failure data 120I, field data 120J, vehicle failure codes through telematics 120K, and collection center data 120L.

The text mining and analytics module 125 may structure the data 120 of the data mart 110 according to a uniform structure. For example, the text analysis and mining process may extract out the meaning of the unstructured data 120. In some embodiments, roots cause analysis is the process of evaluating, identifying and measuring root cause(s) of warranty problems based on structured data 130. The analysis module 135 may assist root cause analysis 140 on staged data mart data. In these embodiments, the data 120 are populated into the data mart 110 from the sources 115 and structured according to a uniform structure to perform the root cause analysis 140.

The root cause analysis output module 145 may generate the root cause analysis output 150 from the root cause analysis 140 performed on the structured data 130 of the data mart 110. The merge module 155 may merge the root cause analysis output 150 with the data 120 of the data mart 110. In addition, the final output module 165 may generate the final output 170 based on a portion of the merged data 160 of the data mart 110.

In the example embodiment illustrated in FIG. 1, the text mining and analytics module 125 communicates with the data mart 110 to structure the data 120 stored in the data mart 110 obtained from the sources 115. The analysis module 135 communicates with the data mart 110 to assist root cause analysis 140 on staged data mart data. Further, the root cause analysis output module 145 communicates with the analysis module 135 to generate the root cause analysis output 150 and also communicates with the merge module 155 that merges the root cause analysis output 150 with the data 120. In addition, the merged data 160 is stored in the data mart 110 and the final output 170 may be generated based on the merged data 160.

Figure 2:
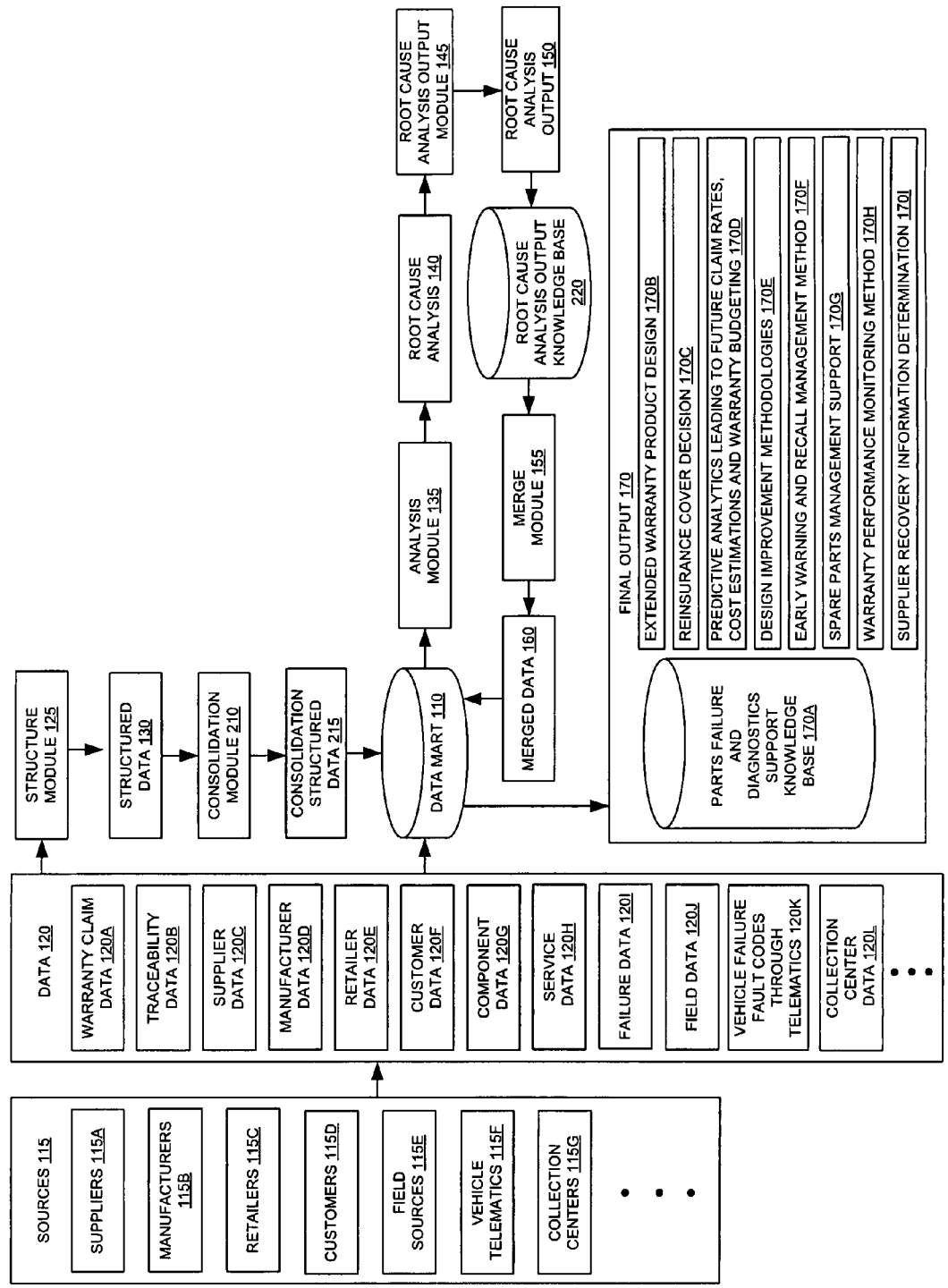
FIG. 2 is a block diagram illustrating sources of data, data, and final output associated with the warranty insight solution framework system of FIG. 1, according to one embodiment.

FIG. 2 is a block diagram illustrating the sources 115 of data 120, the data 120, and the final output 170 associated with the warranty insight solution framework system of FIG. 1, according to one embodiment. Particularly, FIG. 2 illustrates the data mart 110, the sources 115 selected from the group including suppliers 115A, manufacturers 115B, retailers 115C, customers 115D, field sources 115E, vehicle telematics 115F, and collection centers 115G, the data 120 selected from the group including warranty claim data 120A, traceability data 120B, supplier data 120C, manufacturer data 120D, retailer data 120E, customer data 120F, component data 120G, service data 120H, failure data 120I, field data 120J, vehicle failure fault codes through telematics 120K and collection center data 120L, the text mining and analytics module 125, the analysis module 135, the root cause analysis output module 145, the merge module 155, the final output 170 including a parts failure and diagnostics support knowledge base 170A, an extended warranty product design 170B, a reinsurance cover decision 170C, predictive analytics leading to future claim rates, cost estimations and warranty budgeting 170D, design improvement methodologies 170E, early warnings and recall management methodologies 170F, spare parts management support 170G, warranty performance monitoring methodologies 170H, and supplier recovery information determinations 170I, a consolidation module 210 and a root cause analysis output knowledge base 220, according to one embodiment.

The consolidation module 210 may extract meaning out of the unstructured data through the text analyzing and mining the unstructured data and/or consolidate structured data 130 of the data mart 110. In some embodiments, the data 120 from the sources 115 are consolidated, removing, for example, redundant data from the structured data. The root cause analysis output knowledge base 220 may be a database populated with the root cause analysis output 150 obtained from the root cause analysis 140. Further, the root cause analysis output 150 may be merged with the data 120 of the data mart 110 to further populate the data mart 110 with merged data 160.

The final output module 165 may generate the final output 170 associated the root cause analysis 140. In some embodiments, the final output 170 includes solution for the warranty problems and may be generated based on the merged data 160 of the data mart 110.

In the example embodiment illustrated in FIG. 2, data 120 from various sources 115 may be populated and structured in the data mart 110. Consolidated data from the data mart 110 may be analyzed using the analysis module 135 and root cause analysis 140 of the data is performed to obtain the root cause analysis output 150 through the root cause analysis output module 145. The final output 170 of the root cause analysis 140 is generated from the data mart 110 through the final output module 165.

Figure 3:
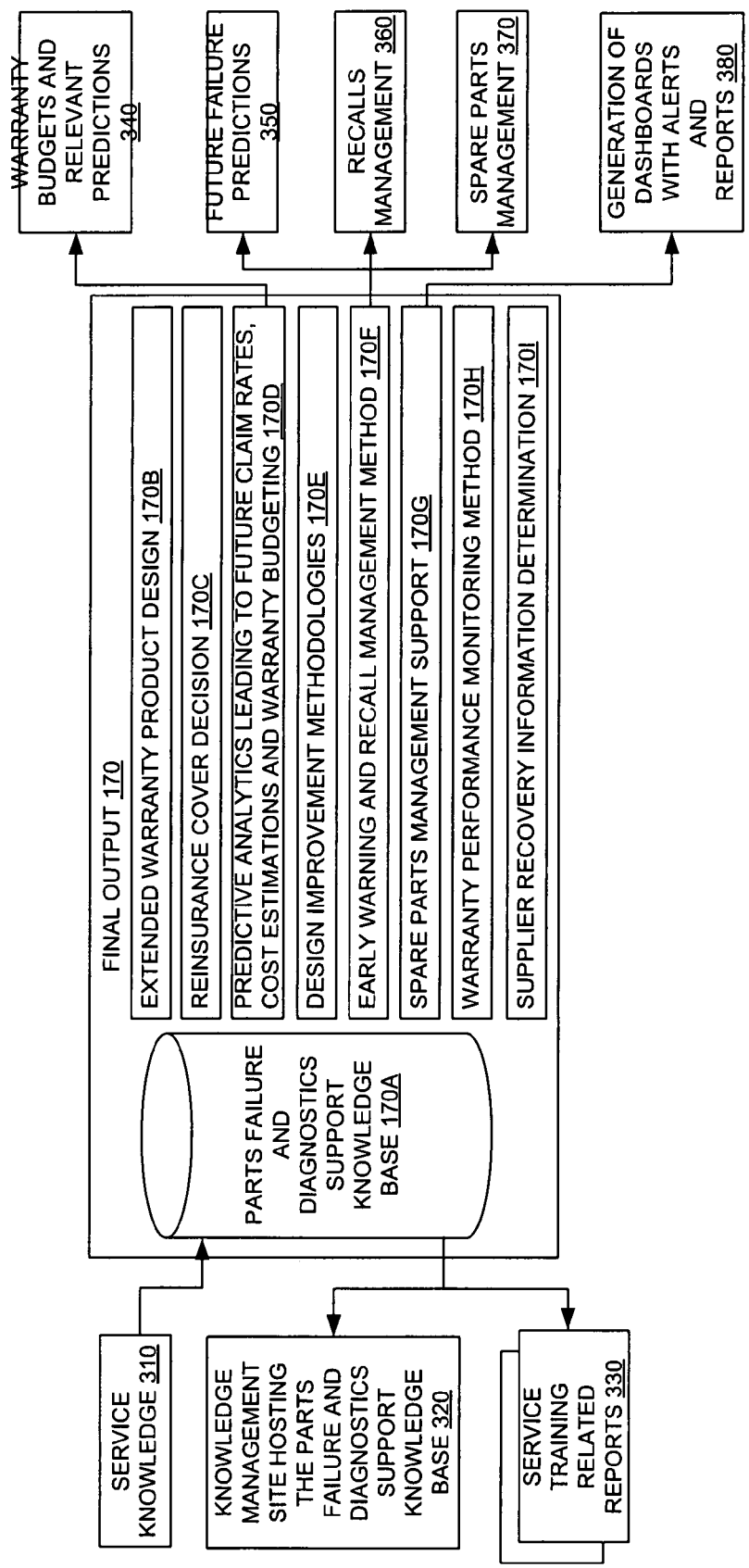
FIG. 3 is a block diagram more particularly illustrating the final output of FIG. 2, according to one embodiment.

FIG. 3 is a block diagram more particularly illustrating the final output 170 of FIG. 2, according to one embodiment. Particularly, FIG. 3 illustrates the final output 170 including a parts failure and diagnostics support knowledge base 170A that includes service knowledge 310, a knowledge management site hosting the parts failure and diagnostics support knowledge base 320, and service training related reports 330, an extended warranty product design 170B, a reinsurance cover decision 170C, predictive analytics leading to future claim rates, cost estimations and warranty budgeting 170D including warranty budgets and relevant predictions 340, design improvement methodologies 170E, early warnings and recall management methodologies 170F including future failure predictions 350, recalls management 360 and/or spare parts management 370, spare parts management support 170G, warranty performance monitoring methodologies 170H including generation of dashboards with alerts and reports 380, and supplier recovery information determinations 170I, according to one embodiment.

The service knowledge 310 may include practices used to identify the root cause analysis 140 and may be used for future awareness and learning. In one embodiment, the service knowledge 310 may be integrated into the parts failure and diagnostics support knowledge base 170A during generation of the parts failure and diagnostics support knowledge base 170A. The knowledge management site 320 may host the parts failure and diagnostics support knowledge base 170A. In some embodiments, the parts failure and diagnostics support knowledge base 170A may include information about the part failures and possible servicing guidelines for the same.

The service training related reports 330 may include bulletins dispatching relevant information for efficient repairs and/or services associated with the warranty failure. In some embodiments, the service training related reports 330 associated with the parts failure and diagnostics support knowledge base 170A is generated during the generation of the final output 170. The warranty budgets and relevant predictions 340 may include resources for future indications of warranty failure. The warranty budgets and/or relevant predictions 340 may be generated with the predictive analytics leading to future claim rates, cost estimations and warranty budgeting 170D during the generation of the final output 170.

The future failure predictions 350, recalls management 360 and spare parts management 370 may be analytic tools applied to the data mart 110 during generation of early warnings and recalls management methodologies 170F. The generation of dashboards with alerts and reports 380 may be a mechanism to monitor warranty and/or component performance. The generation of dashboards with alerts and reports 380 may be associated with the final output 170 corresponding to warranty performance monitoring methodologies 170H as illustrated in FIG. 3.

Figure 4:
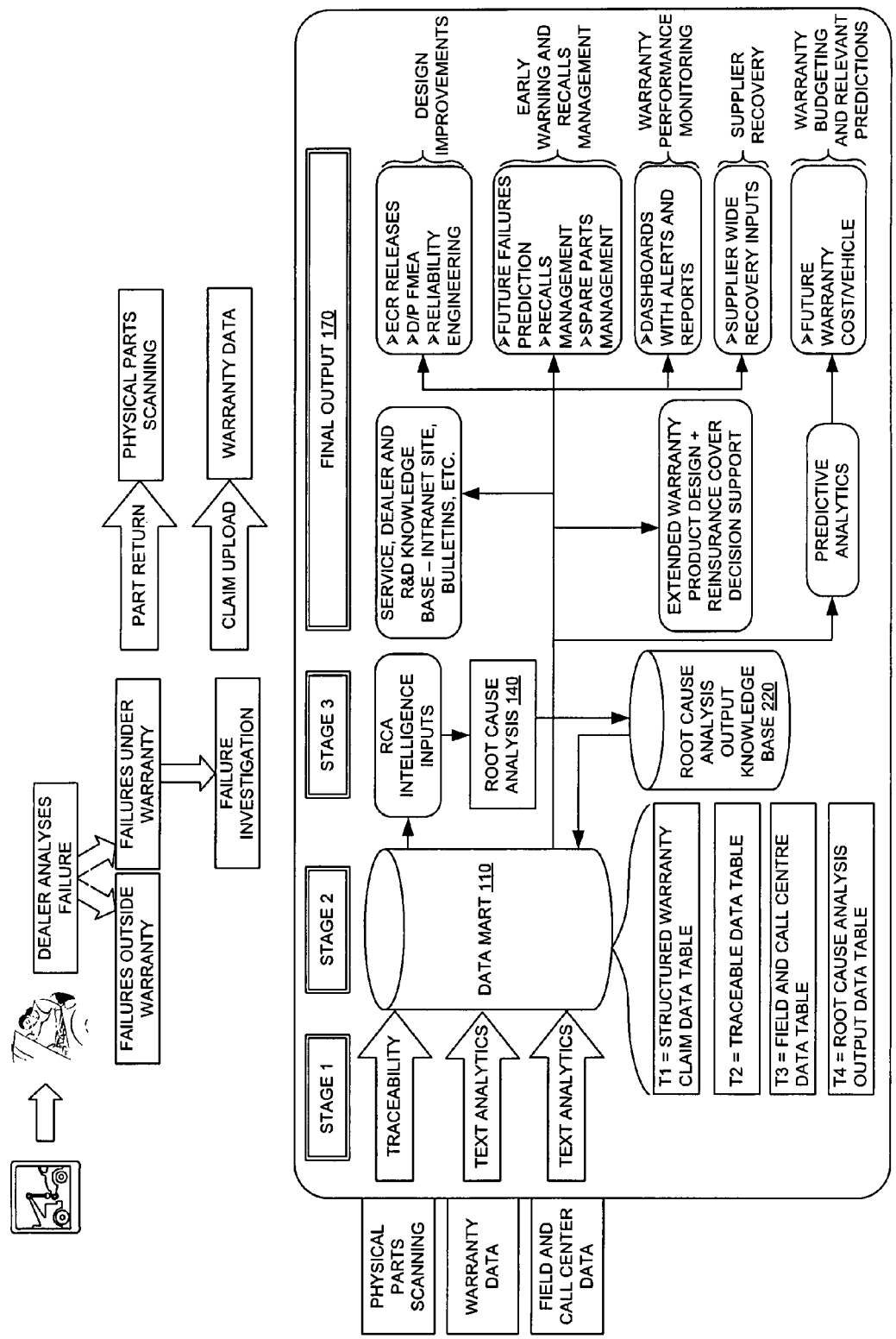
FIG. 4 is an illustrative implementation of the warranty insight solution framework system of FIG. 1, according to one embodiment.

FIG. 4 is an illustrative implementation of the warranty insight solution framework system of FIG. 1, according to one embodiment. Particularly, FIG. 4 illustrates the data mart 110 and the root cause analysis output knowledge base 220, according to one embodiment.

The framework collates information on warranty covered parts (e.g., associated with automotive) from various sources 115 (shown in FIG. 1). For example, the information may include warranty claim data uploaded by dealers, records of customer complaints taken from customers at a dealership or maintenance locations, batch code information on failed parts, field trouble and/or other quality problem related reports generated by field service engineers, and/or service call center inputs. The framework cleans, e.g., structures, unstructured data 120 and consolidates the data 120 along with traceability information into a single warranty data mart 110 that provides root cause analysis (RCA) intelligence inputs to a cross functional RCA team.

Further, the framework outputs from the RCA team flow into the data mart 110. In addition, analytics tools are subsequently applied to this consolidated data mart 110 to provide early warning, recalls management and spare parts management support, assist in providing warranty budgeting indications for the future, etc. The framework also provides a seamless information flow into the design organization by supporting seamless building of Failure Mode Effects Analysis FMEA(s), supporting Release of Engineering Change Requests (ECRs) management by providing triggers to the Product Lifecycle management (PLM) system and capturing details of Engineering Change Order (ECOs) and assisting in various kinds of reliability calculations.

The framework also raises supplier recovery auto debit notes by integrating the output of the RCA process with finance and purchasing modules of an Enterprise Resource Planning (ERP) system after routing the output for confirmation through purchasing team. The framework may also assist in creating customized dashboards and alert mechanisms to monitor Key Performance Indicators (KPIs) across strategic, operational, and/or tactical areas.

In addition, a part failure and diagnostics support knowledge base 170A may be generated by pooling in part failure analysis with service knowledge. The knowledge base 170A may be hosted on a knowledge management site and get accessed by dealers, R&D teams, purchasing and/or service teams. Further, service training related bulletins may be generated for dealerships for more cost efficient repairs and assist in bringing down the warranty costs.

Figure 5:
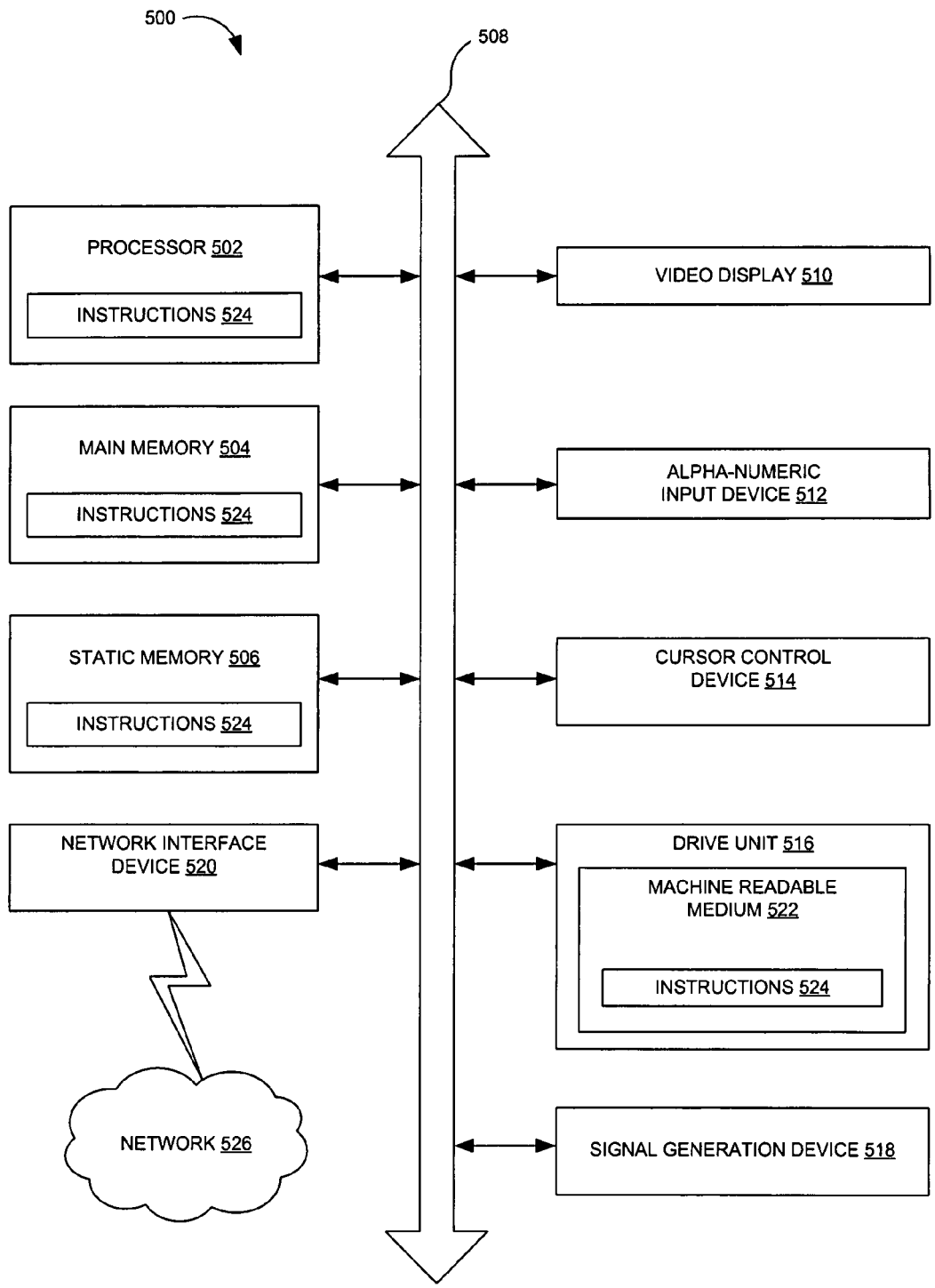
FIG. 5 is a diagrammatic system view of a data processing system in which any of the embodiments disclosed herein may be performed, according to one embodiment.

FIG. 5 is a diagrammatic system view 500 of a data processing system in which any of the embodiments disclosed herein may be performed, according to one embodiment. Particularly, the diagrammatic system view of FIG. 5 illustrates a processor 502, a main memory 504, a static memory 506, a bus 508, a video display 510, an alpha-numeric input device 512, a cursor control device 514, a drive unit 516, a signal generation device 518, a network interface device 520, a machine readable medium 522, instructions 524 and a network 526.

The diagrammatic system view 500 may indicate a personal computer and/or a data processing system in which one or more operations disclosed herein are performed. The processor 502 may be a microprocessor, a state machine, an application specific integrated circuit, a field programmable gate array, etc. The main memory 504 may be a dynamic random access memory and/or a primary memory of a computer system. The static memory 506 may be a hard drive, a flash drive, and/or other memory information associated with the data processing system.

The bus 508 may be an interconnection between various circuits and/or structures of the data processing system. The video display 510 may provide graphical representation of information on the data processing system. The alpha-numeric input device 512 may be a keypad, keyboard and/or any other input device of text (e.g., a special device to aid the physically handicapped). The cursor control device 514 may be a pointing device such as a mouse. The drive unit 516 may be a hard drive, a storage system, and/or other longer term storage subsystem.

The signal generation device 518 may be a bios and/or a functional operating system of the data processing system. The network interface device 520 may perform interface functions (e.g., code conversion, protocol conversion, and/or buffering) required for communications to and from the network 526 between a number of independent devices (e.g., of varying protocols). The machine readable medium 522 may provide instructions on which any of the methods disclosed herein may be performed. The instructions 524 may provide source code and/or data code to the processor 502 to enable any one or more operations disclosed herein.

For example, a storage medium having instructions, that when executed by a computing platform, result in execution of a method of generating parallelizable application units, the method includes populating a data mart (e.g., the data mart 110 of FIG. 1) with data 120 (e.g., selected from the group including warranty claim data, traceability data, supplier data, manufacturer data, retailer data, customer data, component data, service data, failure data, field data, and collection center data) from a number of sources 115 (e.g., selected from the group including suppliers, manufacturers, retailers, customers, field sources, vehicle failure fault codes through telematics, and collection centers), text analyzing and mining the unstructured data 120 of the data mart 110 (e.g., using the text mining and analytics module 125 of FIG. 1) according to a uniform structure, performing root cause analysis 140 (e.g., using the analysis module 135 of FIG. 1) assistance on staged data mart data, generating root cause analysis output 150 (e.g., using the root cause analysis output module 145 of FIG. 1) from the root cause analysis 140, merging the root cause analysis output 150 (e.g., using the merge module 155 of FIG. 1) with the data 120 of the data mart 110, and generating final output 170 (e.g., using the final output module 165 of FIG. 1) based on a portion of the merged data 160 of the data mart 110.

The generating final output 170 may include generating a parts failure and diagnostics support knowledge base 170A, generating an extended warranty product design 170B, generating a reinsurance cover decision 170C, generating predictive analytics leading to future claim rates, cost estimations and warranty budgeting 170D, generating design improvements 170E, generating early warnings and managing recalls 170F, providing spare parts management support 170G, monitoring warranty performance 170H, and/or determining supplier recovery information 170I.

Figure 6:
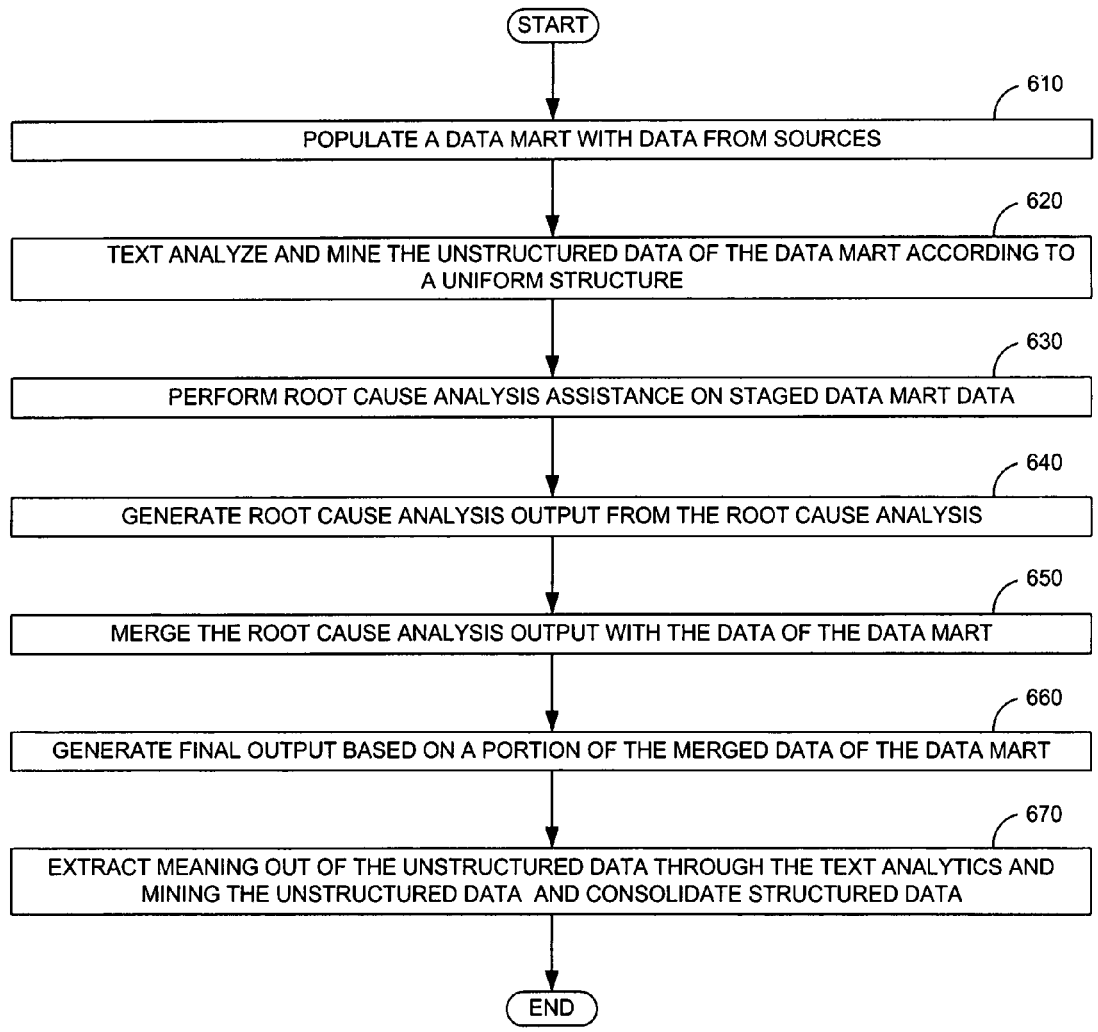
FIG. 6 is a process flow of a warranty insight solution framework method, according to one embodiment.

FIG. 6 is a process flow of a warranty insight solution framework method, according to one embodiment. In operation 610, the data mart 110 may be populated with data 120 from a number of sources 115. In some embodiments, the data 120 includes data selected from the group including warranty claim data 120A, traceability data 120B, supplier data 120C, manufacturer data 120D, retailer data 120E, customer data 120F, component data 120G, service data 120H, failure data 120I, field data 120J, vehicle failure fault codes through telematics 120K, and collection center data 120L. In these embodiments, the sources include sources selected from the group including suppliers 115A, manufacturers 115B, retailers 115C, customers 115D, field sources 115E, vehicle telematics 115F, and collection centers 115G.

In operation 620, the unstructured data 120 of the data mart 110 may be text analyzed and mined (e.g., using the text mining and analytics module 125 of FIG. 1) according to a uniform structure. In operation 630, a root cause analysis 140 assistance may be performed (e.g., using the analysis module 135 of FIG. 1) on staged data mart data. In operation 640, root cause analysis output 150 may be generated (e.g., using the root cause analysis output module 145 of FIG. 1) from the root cause analysis 140. In some embodiments, generating the root cause analysis output 150 from the root cause analysis 140 includes populating the data mart 110 with the root cause analysis output 150.

In operation 650, the root cause analysis output 150 may be merged (e.g., using the merge module 155 of FIG. 1) with the data 120 of the data mart 110. In one embodiment, the root cause analysis output 150 is populated in the data mart 110. In operation 660, the final output 170 may be generated (e.g., using the final output module 165 of FIG. 1) based on portion of the merged data 160 of the data mart 110. In operation 670, meaning of the unstructured data 120 may be extracted out through a text analysis and mining the unstructured data and structured data 130 may be consolidated.

For example, the above framework may be applied in manufacturing organizations that incur significant expenses towards settling warranty claims that may average, for example, around 2-3% of their revenues. Warranty expenses may be significantly reduced if manufacturing organizations identify the root causes of failure by supporting the root cause analysis process with the above described technique, e.g., including multiple sources of failure related information. Further, by using such information the manufacturing organizations can pinpoint the specific products (e.g., with their serial numbers) which have a higher probability of failure and may be able to recall only products having probability of failure.

The above described technique involves capturing all possible inputs from multiple sources, cleansing the unstructured data 120, having all relevant data reside in a single data mart 110, supporting the root cause analysis process, capturing output from the data mart 110, linking this knowledge repository to create a knowledge management site, assisting in extended warranty and warranty coverage decision making, conducting analytics to project future failures thereby managing recalls and spare parts management, assisting in recovery of costs from suppliers, supporting with multiple types of substantiating data, monitoring warranty KPIs through dashboards, alerts and reports, budgeting for warranty reserves, etc., performed in a seamless fashion.

Further, the above framework provides a seamless integration of failure analysis data to the design organization thereby helping in supporting building of Failure Mode Effects Analysis (FMEA) buildups, supporting Engineering Change Requests (ECR) generation, supporting Engineering Change Order (ECO) information consolidation, and assisting in a number of reliability calculations.

Also, the above described method may be in a form of a machine-readable medium embodying a set of instructions that, when executed by a machine, causes the machine to perform any method disclosed herein. It will be appreciated that the various embodiments discussed herein may not be the same embodiment, and may be grouped into various other embodiments not explicitly disclosed therein.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operation). Accordingly, the specification and drawings are to be regarded in an illustrative rather then a restrictive sense.

What is claimed is:

1. A warranty insight solution framework method comprising:
    populating a data mart with data associated with warranty covered parts from a plurality of sources;
    text analyzing and mining unstructured data of the data mart according to a uniform structure;
    consolidating the uniform structured data by removing redundant data from the uniform structured data of the data mart;
    performing root cause analysis assistance on staged data mart data, wherein the root cause analysis includes evaluating, identifying, and measuring root causes of warranty problems on the warranty covered parts based on the consolidated uniform structured data;
    generating a root cause analysis output from the root cause analysis, wherein the root cause analysis output includes information associated with failure of the warranty covered parts and corresponding servicing guidelines;
    merging the root cause analysis output with the data of the data mart; and
    generating a final output including generating design improvement methodologies and providing spare parts management support based on at least a portion of the merged data of the data mart.

2. The method of claim 1, wherein the data comprise data selected from the group consisting of warranty claim data, traceability data, supplier data, manufacturer data, retailer data, customer data, component data, service data, failure data, field data, vehicle failure fault codes through telematics and collection center data.

3. The method of claim 1, wherein the plurality of sources comprises sources selected from the group consisting of suppliers, manufacturers, retailers, customers, field sources, vehicle telematics and collection centers.

4. The method of claim 1, further comprising extracting meaning out of the unstructured data through the text analyzing and mining the unstructured data and consolidating the structured data.

5. The method of claim 1, wherein generating the root cause analysis output from the root cause analysis comprises populating the data mart with the root cause analysis output.

6. The method of claim 1, wherein generating the final output further comprises output selected from the group consisting of:
generating a parts failure and diagnostics support knowledge base;
generating an extended warranty product design;
generating a reinsurance cover decision;
generating predictive analytics leading to future claim rates, cost estimations and warranty budgeting;
generating early warnings and managing recalls;
monitoring warranty performance; and
determining supplier recovery information.

7. The method of claim 6, wherein generating the parts failure and diagnostics support knowledge base comprises at least one of:
integrating service knowledge into the parts failure and diagnostics support knowledge base;
hosting the parts failure and diagnostics support knowledge base on a knowledge management site; and
generating service training related reports associated with the parts failure and diagnostics support knowledge base.

8. The method of claim 6, wherein generating the predictive analytics based on the final output comprises at least one of generating warranty budgets and relevant predictions.

9. The method of claim 6, wherein the generating early warnings and managing recalls based on the final output comprises at least one of:
predicting future failures;
generating recalls; and
managing spare parts.

10. The method of claim 6, wherein monitoring the warranty performance based on the final output comprises generating dashboards with alerts and reports.

11. The method of claim 1 in a form of a machine-readable medium embodying a set of instructions that, when executed by a machine, causes the machine to perform the method of claim 1.

12. A system, comprising:
a processor; and
a memory coupled to the processor, wherein the memory includes:
a data mart populated with data associated with warranty covered parts from a plurality of sources;
a text mining and analytics module to structure unstructured data of the data mart according to a uniform structure;
a consolidation module to consolidate the uniform structured data by removing redundant data from the uniform structured data of the data mart;
an analysis module to assist root cause analysis on staged data mart data, wherein the root cause analysis includes evaluating, identifying, and measuring root causes of warranty problems on the warranty covered parts based on the consolidated uniform structured data;
a root cause analysis output module to generate a root cause analysis output from the root cause analysis, wherein the root cause analysis output includes information associated with failure of the warranty covered parts and corresponding servicing guidelines;
a merge module to merge the root cause analysis output with the data of the data mart; and
a final output module to generate a final output including generating design improvement methodologies and providing spare parts management support based on at least a portion of the merged data of the data mart.

13. The system of claim 12, wherein the data comprise data selected from the group consisting of warranty claim data, traceability data, supplier data, manufacturer data, retailer data, customer data, component data, service data, failure data, field data, vehicle failure fault codes through telematics and collection center data.

14. The system of claim 12, wherein the plurality of sources comprise sources selected from the group consisting of suppliers, manufacturers, retailers, customers, field sources, vehicle telematics and collection centers.

15. The system of claim 12, wherein the consolidation module extracts meaning out of the unstructured data through the text analyzing and mining the unstructured data and consolidates the structured data.

16. The system of claim 12, wherein the data mart is populated with the root cause analysis output.

17. The system of claim 12, wherein the final output module is associated with generation of output selected from the group consisting of:
a parts failure and diagnostics support knowledge base;
an extended warranty product design;
a reinsurance cover decision;
predictive analytics leading to future claim rates, cost estimations and warranty budgeting;
early warnings and recall management methodologies;
warranty performance monitoring methodologies; and
supplier recovery information determinations.

18. The system of claim 17, wherein the parts failure and diagnostics support knowledge base further comprises at least one of:
service knowledge integrated into the parts failure and diagnostics support knowledge base;
a knowledge management site hosting the parts failure and diagnostics support knowledge base; and
service training related reports associated with the parts failure and diagnostics support knowledge base.

19. The system of claim 17, wherein the predictive analytics comprise at least one of warranty budgets and relevant predictions.

20. The system of claim 17, wherein the early warnings and recall management methodologies comprise at least one of:
future failure predictions;
recalls management; and
spare parts management.

21. The system of claim 17, wherein the warranty performance monitoring methodologies comprise generation of dashboards with alerts and reports.

22. An article, comprising:
a storage medium having instructions, that when executed by a computing platform, result in execution of a warranty insight solution framework method, comprising:
populating a data mart with data associated with warranty covered parts from a plurality of sources;
text analyzing and mining unstructured data of the data mart according to a uniform structure;
consolidating the uniform structured data by removing redundant data from the uniform structured data of the data mart;
performing root cause analysis assistance on staged data mart data, wherein the root cause analysis includes evaluating, identifying, and measuring root causes of warranty problems on the warranty covered parts based on the consolidated uniform structured data;

generating a root cause analysis output from the root cause analysis, wherein the root cause analysis output includes information associated with failure of the warranty covered parts and corresponding servicing guidelines;

merging the root cause analysis output with the data of the data mart; and generating a final output including generating design improvement methodologies and providing spare parts management support based on at least a portion of the merged data of the data mart.

23. The article of claim 22, wherein the data comprises data selected from the group consisting of warranty claim data, traceability data, supplier data, manufacturer data, retailer data, customer data, component data, service data, failure data, field data, vehicle failure fault codes through telematics and collection center data.

24. The article of claim 22, wherein the plurality of sources comprises sources selected from the group consisting of suppliers, manufacturers, retailers, customers, field sources, vehicle telematics and collection centers.

25. The article of claim 22, wherein the generating final output further comprises generating final output from the group consisting of:

generating a parts failure and diagnostics support knowledge base;

generating an extended warranty product design;

generating a reinsurance cover decision;

generating predictive analytics leading to future claim rates, cost estimations and warranty budgeting;

generating early warnings and managing recalls;

monitoring warranty performance; and determining supplier recovery information.

* * * * *